US012804045B2

(12) United States Patent
Chiu et al.

(10) Patent No.: US 12,804,045 B2
(45) Date of Patent: Nov. 17, 2026

(54) VIRTUAL AVATAR BEHAVIOR SAFETY MANAGEMENT SYSTEM BASED ON AI MONITORING AND PREDICTION AND METHOD THEREOF

(71) Applicants: SQ Technology (Shanghai) Corporation, Shanghai (CN); Inventec Corporation, Taipei (TW)

(72) Inventors: Chuan-Cheng Chiu, Taipei (TW); Tao Yu, Shanghai (CN); Yi-Ming Zhan, Shanghai (CN)

(73) Assignees: SQ Technology (Shanghai) Corporation, Shanghai (CN); Inventec Corporation, Taipei City (TW)

( * ) Notice: Subject to any disclaimer, the term of this patent is extended or adjusted under 35 U.S.C. 154(b) by 123 days.

(21) Appl. No.: 19/021,130

(22) Filed: Jan. 14, 2025

(65) Prior Publication Data

US 2026/0129099 A1 May 7, 2026

(30) Foreign Application Priority Data

Nov. 1, 2024 (CN) ........................ 202411557496.2

(51) Int. Cl.

| | |
|---|---|
| ***A63F 13/75*** | (2014.01) |
| ***G10L 15/183*** | (2013.01) |
| ***G10L 15/22*** | (2006.01) |
| ***H04L 67/131*** | (2022.01) |
| ***H04L 67/50*** | (2022.01) |

(52) U.S. Cl.

CPC ............ *H04L 67/131* (2022.05); *A63F 13/75* (2014.09); *G10L 15/183* (2013.01); *G10L 15/22* (2013.01); *H04L 67/535* (2022.05); *A63F 2300/5586* (2013.01)

(58) Field of Classification Search

CPC ... H04L 67/131; H04L 67/535; G10L 15/183; G10L 15/22; A63F 13/75; A63F 13/70; A63F 13/87; A63F 2300/5586

USPC ............................................................ 463/29

See application file for complete search history.

(56) References Cited

U.S. PATENT DOCUMENTS

| | | | | |
|---|---|---|---|---|
| 11,717,760 | B2 * | 8/2023 | Chandrasekaran | A63F 13/35 463/42 |
| 11,996,117 | B2 * | 5/2024 | Huffman | G10L 15/26 |
| 2020/0164278 | A1 * | 5/2020 | Andre | G06Q 10/10 |
| 2023/0182029 | A1 * | 6/2023 | Thomas | A63F 13/355 463/42 |

(Continued)

*Primary Examiner* — Allen Chan

(57) ABSTRACT

A virtual avatar behavior safety management system based on AI monitoring and prediction and a method thereof are disclosed. In the system, a speech conversation between a user-controlled virtual avatar and another virtual avatar are monitored in real time, and a voice recognition technology and a speech-to-text technology are used to convert the speech conversation into text messages, and a conversation prediction message is generated through a retrieval-augmented generation (RGA) technology, and input into a pre-trained safety protection language model to predict whether the virtual avatar exhibits an inappropriate behavior characteristic. When the virtual avatar exhibits the inappropriate behavior characteristic, user's control over the virtual avatar is immediately prohibited, thereby achieving the technical effect of enhancing interactive safety in the virtual world.

10 Claims, 4 Drawing Sheets

(56) References Cited

U.S. PATENT DOCUMENTS

2025/0269287 A1 * 8/2025 Tung .................... A63F 13/79

* cited by examiner

VIRTUAL AVATAR BEHAVIOR SAFETY MANAGEMENT SYSTEM BASED ON AI MONITORING AND PREDICTION AND METHOD THEREOF

BACKGROUND OF THE INVENTION

1. Field of the Invention

The present invention relates to a safety management system and a method thereof, more particularly to a virtual avatar behavior safety management system based on AI monitoring and prediction and a method thereof.

2. Description of the Related Art

In recent years, with the widespread development of various immersive technologies, the application of virtual avatar has emerged rapidly. However, how to improve interaction safety in the virtual world has been one of the key challenges that companies are eager to solve.

Conventional virtual avatars are usually controlled by users, for example, to move or interact in the virtual world. However, since the user controls the virtual avatar in the virtual world, there are no real-world constraints, it leads to frequent occurrences of malicious harassment, fraud, inappropriate language, and other issues. Therefore, the virtual world faces a problem of insufficient interaction safety.

In response to this, some companies have proposed methods using keyword detection to determine whether certain pre-set keywords (such as offensive language) appear in a conversation content, and muting manner to mute the virtual avatar when such keywords are identified. However, this method can only work for the pre-set keywords and is ineffective when the keywords have not been pre-configured, it is obvious that the method has limited applicability and cannot detect cases where the users substitute words to bypass keyword detection, such as using English, numbers, or homophones for abusive behavior. Therefore, the existing technologies still fail to effectively solve the problem of insufficient interaction safety in the virtual world.

According to above-mentioned contents, what is needed is to develop an improved solution to solve the conventional problem of insufficient interaction safety in the virtual world.

SUMMARY OF THE INVENTION

An objective of the present invention is to disclose a virtual avatar behavior safety management system based on AI monitoring and prediction and a method thereof, to solve the conventional problem.

To achieve the objective, the present invention discloses a virtual avatar behavior safety management system based on AI monitoring and prediction, and virtual avatar behavior safety management system includes a non-transitory computer-readable storage medium and a hardware processor. The non-transitory computer-readable storage medium is configured to store computer readable instructions, and a pre-trained safety protection language model. The hardware processor is electrically connected to the non-transitory computer-readable storage medium, and configured to execute the computer readable instructions to operate: when a user operates a virtual avatar to perform conversation, extracting the conversation of the virtual avatar to generate a conversation speech, and converting the conversation speech into conversation messages through a voice recognition technology and a speech-to-text technology; using a retriever of retrieval-augmented generation (RGA) to retrieve knowledge messages related to the conversation messages from an external knowledge base, and using a generator of the retrieval-augmented generation to generate a conversation prediction message, which is accurate and highly relevant, based on the knowledge message and a natural language processing technology; inputting the conversation prediction message into the safety protection language model to predict whether the virtual avatar exhibits an inappropriate behavior characteristic, and when the virtual avatar exhibits the inappropriate behavior characteristic, immediately prohibiting the user from controlling the virtual avatar.

To achieve the objective, the present invention discloses a virtual avatar behavior safety management method based on AI monitoring and prediction, wherein the virtual avatar behavior safety management method is executed by a hardware processor and includes the steps of: loading a pre-trained safety protection language model, by the hardware processor; when a user operates a virtual avatar to perform conversation, extracting the conversation of the virtual avatar to generate a conversation speech, and converting the conversation speech into conversation messages through voice recognition technology and speech-to-text technology, by the hardware processor; using a retriever of retrieval-augmented generation (RGA) to retrieve knowledge messages related to the conversation message from an external knowledge base, and using a generator of the RGA to generate a conversation prediction message, which is accurate and highly relevant, based on the knowledge messages and a natural language processing technology, by the hardware processor; inputting the conversation prediction messages to the safety protection language model to predict whether the virtual avatar exhibits an inappropriate behavior characteristic, and when the virtual avatar exhibits the inappropriate behavior characteristic, immediately prohibiting the user from controlling the virtual avatar, by the hardware processor.

According to the above-mentioned system and method of the present invention, the difference between the present invention and conventional technology is that, in the present invention, the speech conversation between the user-controlled virtual avatar and another virtual avatar are monitored in real time, and the voice recognition technology and the speech-to-text technology are used to convert the speech conversation into the text messages, and the conversation prediction message is generated through the retrieval-augmented generation (RGA) technology, and input into the pre-trained safety protection language model to predict whether the virtual avatar exhibits the inappropriate behavior characteristic, and when the virtual avatar exhibits the inappropriate behavior characteristic, user's control over the virtual avatar is immediately prohibited.

According to the above-mentioned solution, the present invention can achieve the technical effect of enhancing interactive safety in the virtual world.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
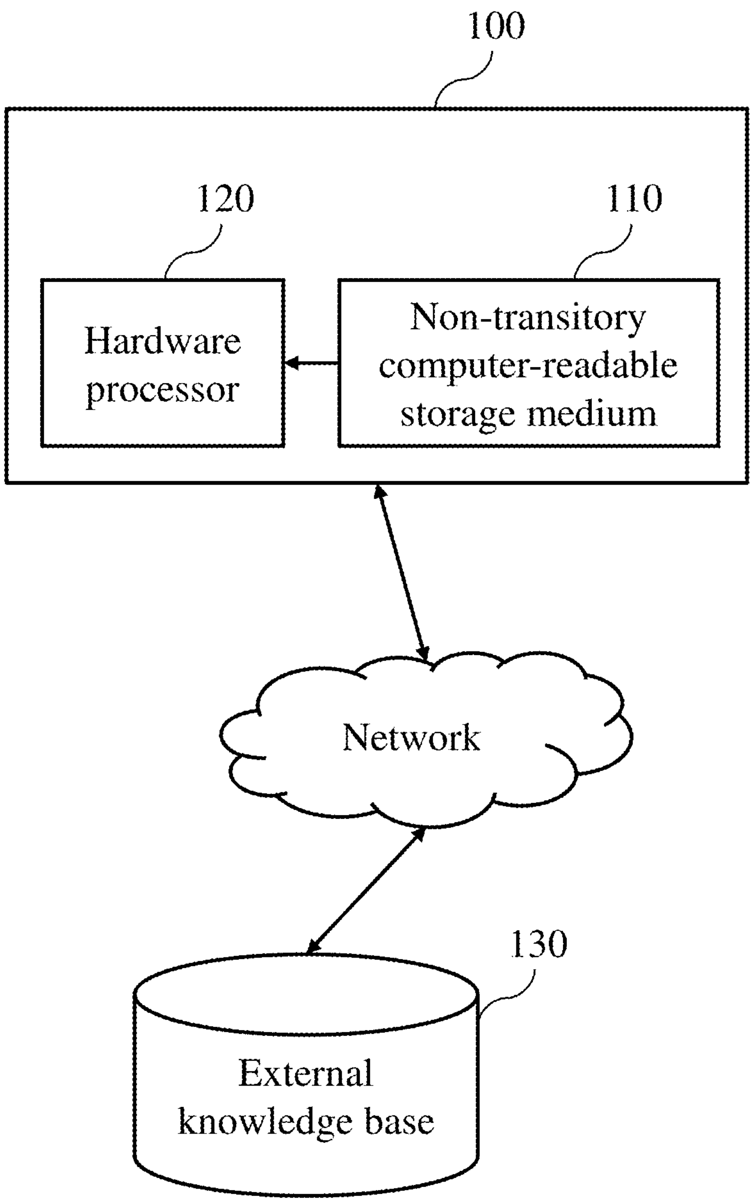
FIG. 1 is a system block diagram of a virtual avatar behavior safety management system based on AI monitoring and prediction, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions, and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise. As used herein, the term "or" includes any and all combinations of one or more of the associated listed items.

It will be acknowledged that when an element or layer is referred to as being "on", "connected to" or "coupled to" another element or layer, it can be directly on, connected or coupled to the other element or layer, or intervening elements or layers may be present. In contrast, when an element is referred to as being "directly on", "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIG. 1. FIG. 1 is a system block diagram of a virtual avatar behavior safety management system based on AI monitoring and prediction according to the present invention. As shown in FIG. 1, the virtual avatar behavior safety management system includes a non-transitory computer-readable storage medium 110 and a hardware processor 120, which are disposed in a computer device 100. The non-transitory computer-readable storage medium 110 is configured to store computer readable instructions, and a pre-trained safety protection language model. In actual implementation, the non-transitory computer-readable storage medium 100 may include a hard disk, an optical disk, a flash memory, or the like. The computer readable instructions can be executed by the computer device 100. The computer readable instructions can be assembly language instructions, instruction-set-structure instructions, machine instructions, machine-related Instructions, micro-instructions, firmware instructions, or source codes or object codes written in any combination of one or more programming languages. The programming language includes object-oriented programming languages, such as: Common Lisp, Python, C++, Objective-C, Smalltalk, Delphi, Java, Swift, C#, Perl, Ruby, or PHP; the programming language can include regular procedural programming languages, such as C language or similar programming languages. In an embodiment, the safety protection language model can include an AI model based on bidirectional encoder representations from transformers (BERT) technology or a generative pre-trained transformer (GPT) technology, and the safety protection language model can be pre-trained with training data comprising text, images, sounds, or combinations thereof related to inappropriate language, fraudulent intent, unusual behavior, or potential safety threat. It should be especially noted that when the safety protection language model predicts whether the virtual avatar exhibits an inappropriate behavior characteristic, dynamic adjustment of weights based on a conversation topic between users and an interpersonal relationship of the users is allowed to increase prediction accuracy. For example, in a condition that the conversation topic is "joke" and the interpersonal relationship is "close friends", the safety protection language model can adjust the weights to make a lenient prediction about whether the virtual avatar exhibits the inappropriate behavior characteristic; conversely, when the interpersonal relationship is "strangers", the weights are adjusted to predict strictly whether the virtual avatar exhibits the inappropriate behavior characteristic. The weight adjustment can be achieved through techniques such as fine-tuning, post-training optimization, or similar methods.

The hardware processor 120 is electrically connected to the non-transitory computer-readable storage medium 110 and configured to execute the computer readable instruction to perform the following operations. When a user operates a virtual avatar to perform conversation, the hardware processor 120 extracts the conversation of the virtual avatar to generate a conversation speech, and converts the conversation speech into conversation messages through a voice recognition technology and a speech-to-text technology. The hardware processor 120 uses a retriever of retrieval-augmented generation (RGA) to retrieve knowledge messages related to the conversation messages from an external knowledge base 130, and uses a generator of the retrieval-augmented generation to generate a conversation prediction message, which is accurate and highly relevant, based on the knowledge message and a natural language processing technology. The hardware processor 120 inputs the conversation prediction message into the safety protection language model to predict whether the virtual avatar exhibits an inappropriate behavior characteristic, and when the virtual avatar exhibits the inappropriate behavior characteristic, the hardware processor 120 immediately prohibits the user from controlling the virtual avatar. In practical implementation, the inappropriate behavior characteristic comprises a conversation related to inappropriate language, fraudulent intent, unusual behavior, or potential safety threat. In an embodiment, when the prediction of the safety protection language model matches the inappropriate behavior characteristic, warning points are accumulated, and a control time of prohibiting the user from controlling the virtual avatar is dynamically adjusted based on the warning points. The warning points and the control time are negatively correlated to each other, that is, the more warning points accumulated, the less control time of controlling the virtual avatar. Additionally, the external knowledge base 130 comprises news, pictures, sounds, images, and a combination thereof related to fraud, bullying, emotional blackmail and emotional control, and the external knowledge base 130 can be embedded with vectors corresponding to the news, pictures, sounds, images, and a combination thereof, so that the retriever is allowed to perform similarity search.

It is to be particularly noted that, in actual implementation, the above-mentioned solution of the present invention can be implemented fully or partly based on hardware, for example, the hardware processor 120 of the system can be implemented by integrated circuit chip, system on chip (SoC), a complex programmable logic device (CPLD), or a field programmable gate array (FPGA). The non-transitory computer-readable storage medium 110 of the present invention records computer readable program instructions, and the hardware processor 120 can execute the computer readable program instructions to implement concepts of the present invention. The non-transitory computer-readable storage medium 110 can be a tangible apparatus for holding and storing the instructions executable of an instruction executing apparatus. The non-transitory computer-readable storage medium 110 can be, but not limited to electronic storage apparatus, magnetic storage apparatus, optical storage apparatus, electromagnetic storage apparatus, semiconductor storage apparatus, or any appropriate combination thereof. More particularly, the non-transitory computer-readable storage medium 110 can include a hard disk, an RAM memory, a read-only-memory, a flash memory, an optical disk, a floppy disc, or any appropriate combination thereof, but this exemplary list is not an exhaustive list. The non-transitory computer-readable storage medium 110 is not interpreted as the instantaneous signal such a radio wave or other freely propagating electromagnetic wave, or electromagnetic wave propagated through waveguide, or other transmission medium (such as optical signal transmitted through fiber cable), or electric signal transmitted through electric wire. Furthermore, the computer readable program instruction can be downloaded from the non-transitory computer-readable storage medium 110 to each calculating/processing apparatus, or downloaded through network, such as internet network, local area network, wide area network and/or wireless network, to external computer equipment or external storage apparatus. The network includes copper transmission cable, fiber transmission, wireless transmission, router, firewall, switch, hub and/or gateway. The network card or network interface of each calculating/processing apparatus can receive the computer readable program instructions from network and forward the computer readable program instruction to store in non-transitory computer-readable storage medium 110 of each calculating/processing apparatus.

Figure 2:
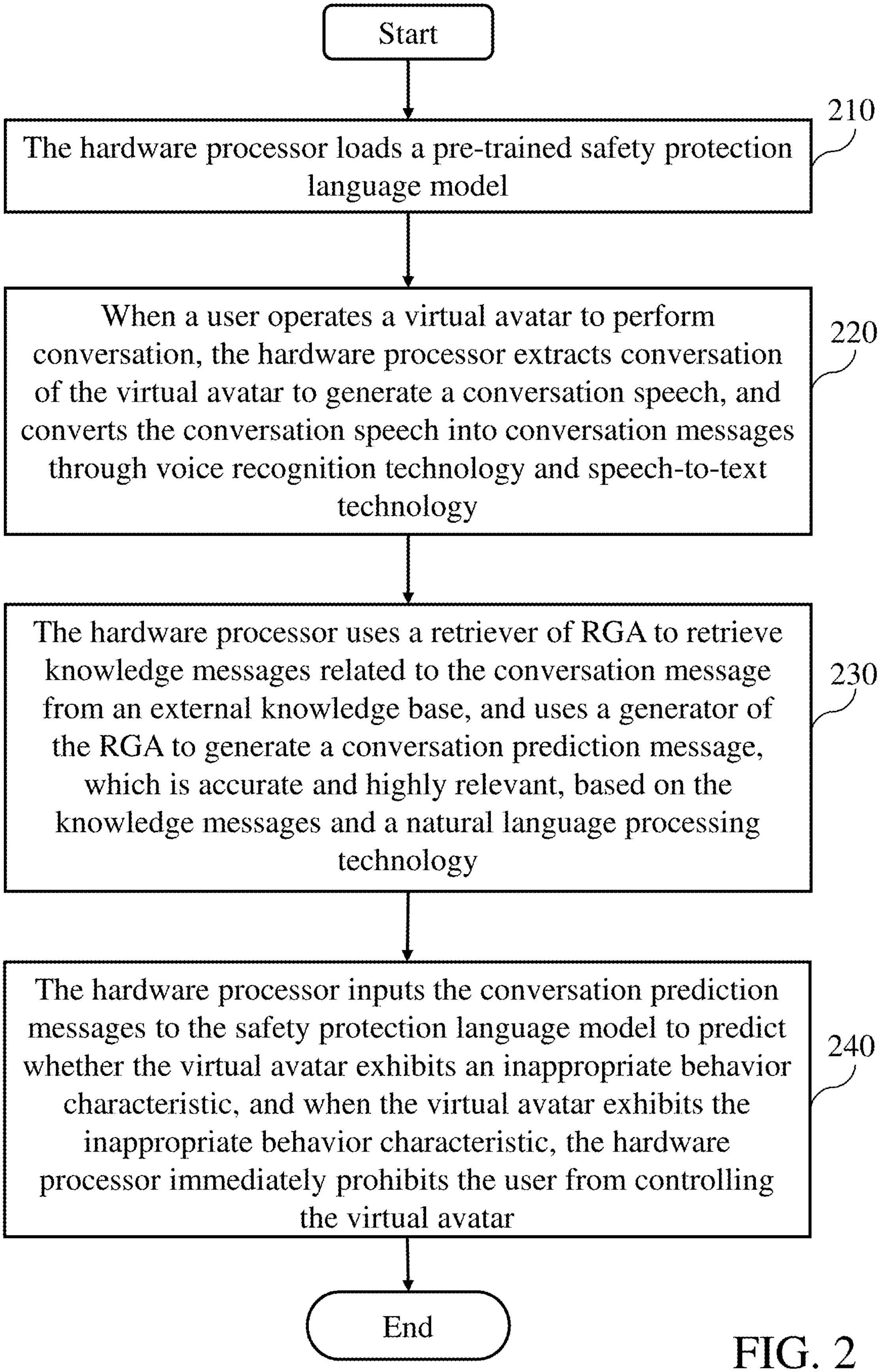
FIG. 2 is a flowchart of a virtual avatar behavior safety management method based on AI monitoring and prediction, according to the present invention.

Please refer to FIG. 2. FIG. 2 is a flowchart of a virtual avatar behavior safety management method based on AI monitoring and prediction, according to the present invention. As shown in FIG. 2, the virtual avatar behavior safety management method is executed by a hardware processor to perform the following steps. In a step 210, the hardware processor 120 loads a pre-trained safety protection language model. In a step 220, when a user operates a virtual avatar to perform conversation, the hardware processor 120 extracts conversation of the virtual avatar to generate a conversation speech, and converts the conversation speech into conversation messages through voice recognition technology and speech-to-text technology. In a step 230, the hardware processor 120 uses a retriever of retrieval-augmented generation (RGA) to retrieve knowledge messages related to the conversation message from an external knowledge base, and uses a generator of the RGA to generate a conversation prediction message, which is accurate and highly relevant, based on the knowledge messages and a natural language processing technology. In a step 240, the hardware processor 120 inputs the conversation prediction messages to the safety protection language model to predict whether the virtual avatar exhibits an inappropriate behavior characteristic, and when the virtual avatar exhibits the inappropriate behavior characteristic, the hardware processor 120 immediately prohibits the user from controlling the virtual avatar. Through the above-mentioned steps, the speech conversation between the user-controlled virtual avatar and another virtual avatar are monitored in real time, and the voice recognition technology and the speech-to-text technology are used to convert the speech conversation into the text messages, and the conversation prediction message is generated through the retrieval-augmented generation (RGA) technology, and input into the pre-trained safety protection language model to predict whether the virtual avatar exhibits the inappropriate behavior characteristic, and when the virtual avatar exhibits the inappropriate behavior characteristic, user's control over the virtual avatar is immediately prohibited.

Figure 3:
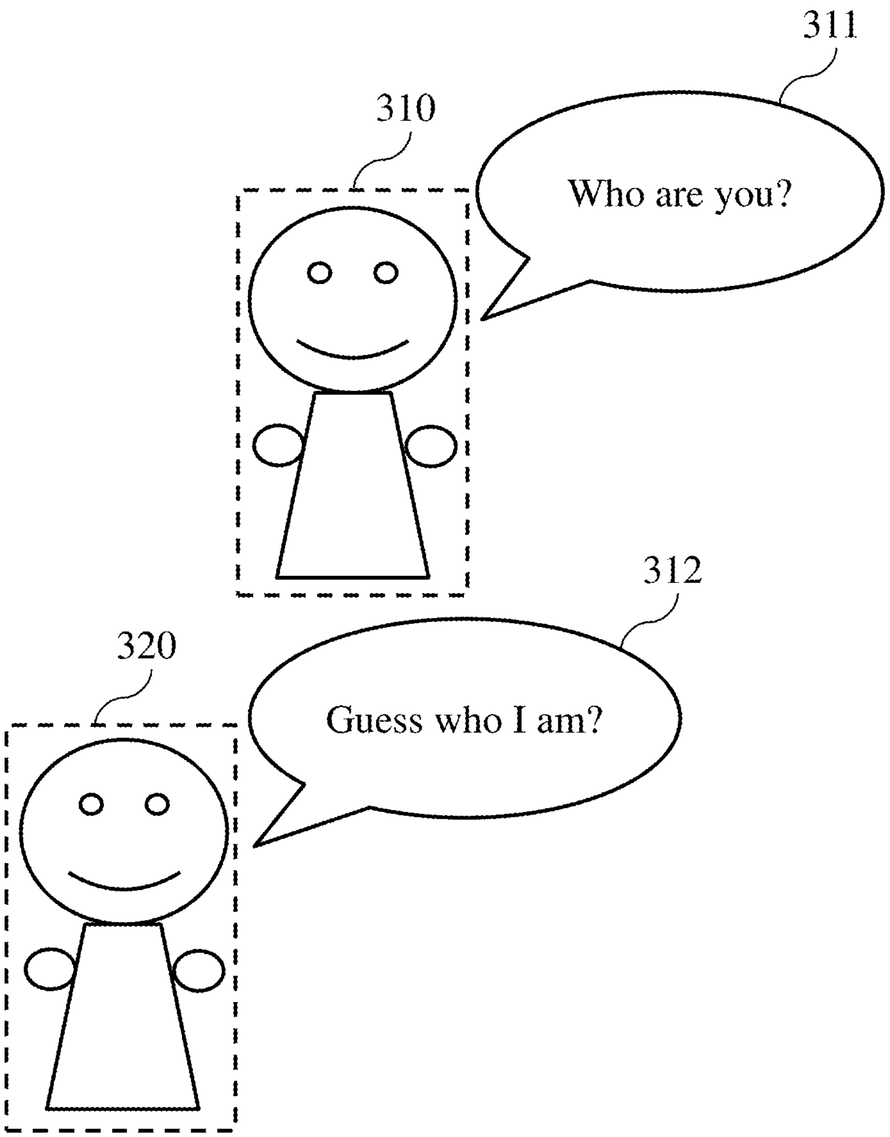
FIG. 3 is a schematic view of an operation of prohibiting an inappropriate behavior of a virtual avatar, according to an application of the present invention.

An embodiment of the present invention will be illustrated in the following paragraphs with reference to FIG. 3 and FIG. 4. Please refer to FIG. 3. FIG. 3 is a schematic view of an operation of prohibiting an inappropriate behavior of a virtual avatar, according to an application of the present invention. In practical implementation, when a user operates a virtual avatar 310 to perform conversation, the hardware processor 120 can extract the conversation between a virtual avatar 310 and another virtual avatar 320. In the case of FIG. 3, conversation blocks 311 and 312 are used to represent the conversation speech of the virtual avatar 310 and the virtual avatar 320, the hardware processor 120 can capture the speech of the virtual avatar 310 and the virtual avatar 320 to generate the conversation speech, and convert the conversation speech into conversation messages through voice recognition technology and speech-to-text technology, for example, the conversation messages can be A: "Who are you?" and B: "Guess who I am?". Next, the hardware processor 120 uses a retriever of RAG to retrieve knowledge messages related to the conversation messages from an external knowledge base 130, and uses a generator of RAG to generate an accurate and highly relevant conversation prediction message based on the knowledge message and a natural language processing technology, for example, the conversation prediction messages can be "OO?", and "Yeah, long time no see, I changed my phone . . . can you help me buy some points?" where "OO" represents any name or nickname. Next, the hardware processor 120 inputs the conversation prediction message into the safety protection language model to predict whether the virtual avatar 320 exhibits an inappropriate behavior characteristic (that is, the conversation prediction message matches the inappropriate behavior characteristic); in this case, when the conversation prediction message matches the inappropriate behavior characteristic (that is, inappropriate behavior characteristic is identified), the user is immediately prohibited from controlling the virtual avatar 320, for example, the user is prohibited to control movement or speech of the virtual avatar 320. In this way, it is possible to immediately stop potential inappropriate behavior before the virtual avatar 320 engages in such behavior. In practical implementation, to avoid misjudgment, when the safety protection language model predicts whether the virtual avatars 310 and 320 exhibit the inappropriate behavior characteristic, dynamic adjustment of weights is allowed to increase prediction accuracy based on their conversation topic and interpersonal relationship. For example, when their conversation topic is "joke" and their interpersonal relationship is "friends", the weights can be dynamically adjusted to loosen the judgment standard; conversely, when two users are strangers with no connection or only acquaintances, the weights can be dynamically adjusted to set the judgment standard as strict. In practice, determining whether two users are strangers or even acquaintances can be based on interaction history between the virtual avatar 310 and the virtual avatar 320, for example, the interaction history can be whether they have ever conversed, or the duration of their conversation.

Figure 4:
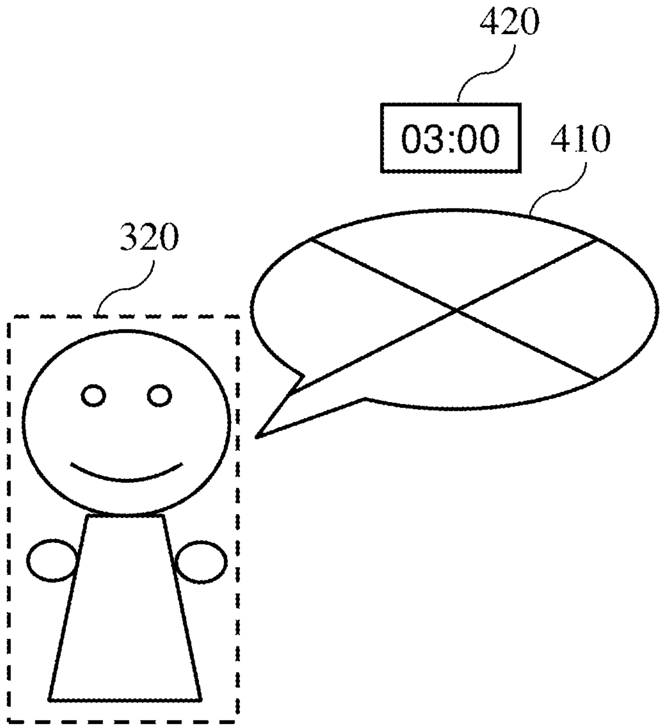
FIG. 4 is a schematic view of an operation of adjusting time for prohibiting from controlling a virtual avatar, according to an application of the present invention.

Please refer to FIG. 4. FIG. 4 is a schematic view of an operation of adjusting time of prohibiting control for a virtual avatar, according to an application of the present invention. In practical implementation, when the safety protection language model predicts a conversation containing inappropriate language, fraudulent intent, unusual behavior, and potential safety threat, (that is, the conversation matches the inappropriate behavior characteristic), the hardware processor 120 accumulates the warning points; for example, with each occurrence of the inappropriate behavior characteristic, the warning points are increased by 1 (an initial value of the warning points is zero). The control time of prohibiting the user from controlling the virtual avatar 320 can be dynamically adjusted based on the warning points, for example, the warning points and the control time are negatively correlated to each other. For example, when the inappropriate behavior characteristic is identified, as shown in FIG. 4, a speech-prohibited block 410 is displayed, and a speech-prohibited time 420 (such as 3 minutes) is shown above the speech-prohibited block 410. When another occurrence of the inappropriate behavior characteristic is predicted again after 3 minutes, the warning points becomes 2, and the original speech-prohibited time 420 is extended from the original 3 minutes to a longer time, such as 4 minutes. It should be especially noted that, besides prohibiting speech, the present invention does not limit the manner for prohibiting the user from controlling the virtual avatar 320, that is, any manner for prohibiting the control for the virtual avatar 320 falls within the scope of the application of the present invention. For example, the manner of prohibiting the user from controlling the virtual avatar 320 can include prohibiting movement of the avatar 320 or prohibiting the user from login or logout.

According to above-mentioned contents, the difference between the present invention and the conventional technology is that, in the present invention, the speech conversation between the user-controlled virtual avatar and another virtual avatar are monitored in real time, and the voice recognition technology and the speech-to-text technology are used to convert the speech conversation into the text messages, and the conversation prediction message is generated through the retrieval-augmented generation (RGA) technology, and input into the pre-trained safety protection language model to predict whether the virtual avatar exhibits the inappropriate behavior characteristic, and when the virtual avatar exhibits the inappropriate behavior characteristic, user's control over the virtual avatar is immediately prohibited. Therefore, the above-mentioned solution of the present invention is able to solve the conventional problem to achieve the technical effect of enhancing interactive safety in the virtual world.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A virtual avatar behavior safety management system based on AI monitoring and prediction, comprising:

a non-transitory computer-readable storage medium, configured to store computer readable instructions, and a pre-trained safety protection language model; and a hardware processor, electrically connected to the non-transitory computer-readable storage medium, and configured to execute the computer readable instructions to operate:

when a user operates a virtual avatar to perform conversation, extracting the conversation of the virtual avatar to generate a conversation speech, and converting the conversation speech into conversation messages through a voice recognition technology and a speech-to-text technology;

using a retriever of retrieval-augmented generation (RGA) to retrieve knowledge messages related to the conversation messages from an external knowledge base, and using a generator of the retrieval-augmented generation to generate a conversation prediction message, which is accurate and highly relevant, based on the knowledge message and a natural language processing technology; and inputting the conversation prediction message into the safety protection language model to predict whether the virtual avatar exhibits an inappropriate behavior characteristic, and when the virtual avatar exhibits the inappropriate behavior characteristic, immediately prohibiting the user from controlling the virtual avatar.

2. The virtual avatar behavior safety management system based on AI monitoring and prediction according to claim 1, wherein the inappropriate behavior characteristic comprises the conversation related to inappropriate language, fraudulent intent, unusual behavior, or potential safety threat, wherein when the conversation prediction message matches the inappropriate behavior characteristic, warning points are accumulated, and a control time of prohibiting the user from controlling the virtual avatar is dynamically adjusted based on the warning points, and the warning points and the control time are negatively correlated to each other.

3. The virtual avatar behavior safety management system based on AI monitoring and prediction according to claim 1, wherein the safety protection language model comprises bidirectional encoder representations from transformers (BERT) technology, generative pre-trained transformer (GPT) technology, and is pre-trained with training data comprising text, images, sounds, or combinations thereof related to inappropriate language, fraudulent intent, unusual behavior, and potential safety threat.

4. The virtual avatar behavior safety management system based on AI monitoring and prediction according to claim 1, wherein the external knowledge base comprises news, pictures, sounds, images, and a combination thereof related to fraud, bullying, emotional blackmail, and emotional control, and the external knowledge base is embedded with vectors corresponding to the news, pictures, sounds, images, and a combination thereof for the retriever to perform a similarity search.

5. The virtual avatar behavior safety management system based on AI monitoring and prediction according to claim 1, wherein when the safety protection language model predicts whether the virtual avatar exhibits the inappropriate behavior characteristic, and dynamic adjustment of weights based on a conversation topic and an interpersonal relationship of the user is allowed to increase prediction accuracy.

6. A virtual avatar behavior safety management method based on AI monitoring and prediction, wherein the virtual avatar behavior safety management method is executed by a hardware processor and comprises:

loading a pre-trained safety protection language model, by the hardware processor;

when a user operates a virtual avatar to perform conversation, extracting the conversation of the virtual avatar to generate a conversation speech, and converting the conversation speech into conversation messages through voice recognition technology and speech-to-text technology, by the hardware processor;

using a retriever of retrieval-augmented generation (RGA) to retrieve knowledge messages related to the conversation message from an external knowledge base, and using a generator of the RGA to generate a conversation prediction message, which is accurate and highly relevant, based on the knowledge messages and a natural language processing technology, by the hardware processor; and inputting the conversation prediction messages to the safety protection language model to predict whether the virtual avatar exhibits an inappropriate behavior characteristic, and when the virtual avatar exhibits the inappropriate behavior characteristic, immediately prohibiting the user from controlling the virtual avatar, by the hardware processor.

7. The virtual avatar behavior safety management method based on AI monitoring and prediction according to claim 6, wherein the inappropriate behavior characteristic comprises the conversation related to inappropriate language, fraudulent intent, unusual behavior, or potential safety threat, wherein when the conversation prediction message matches the inappropriate behavior characteristic, warning points are accumulated, and a control time of prohibiting the user from controlling the virtual avatar is dynamically adjusted based on the warning points, and the warning points and the control time are negatively correlated to each other.

8. The virtual avatar behavior safety management method based on AI monitoring and prediction according to claim 6, wherein the safety protection language model comprises bidirectional encoder representations from transformers (BERT) technology, generative pre-trained transformer (GPT) technology, and is pre-trained with training data comprising text, images, sounds, or combinations thereof related to inappropriate language, fraudulent intent, unusual behavior, and potential safety threat.

9. The virtual avatar behavior safety management method based on AI monitoring and prediction according to claim 6, wherein the external knowledge base comprises news, pictures, sounds, images, and a combination thereof related to fraud, bullying, emotional blackmail, and emotional control, and the external knowledge base is embedded with vectors corresponding to the news, pictures, sounds, images, and a combination thereof for the retriever to perform a similarity search.

10. The virtual avatar behavior safety management method based on AI monitoring and prediction according to claim 6, wherein when the safety protection language model predicts whether the virtual avatar exhibits the inappropriate behavior characteristic, and dynamic adjustment of weights based on a conversation topic and an interpersonal relationship of the user is allowed to increase prediction accuracy.

* * * * *